US010817411B2

(12) United States Patent
Durairaj (10) Patent No.: US 10,817,411 B2
(45) Date of Patent: Oct. 27, 2020

(54) AUTOMATED TESTCASE BUILD ENGINE AND PREDICTION-BASED TEST SYSTEM

(71) Applicant: Dell Products L. P., Round Rock, TX (US)

(72) Inventor: Arockiaraj Durairaj, Bangalore (IN)

(73) Assignee: Dell Products L. P., Round Rock, TX (US)

( * ) Notice: Subject to any disclaimer, the term of this patent is extended or adjusted under 35 U.S.C. 154(b) by 0 days.

(21) Appl. No.: 16/161,710

(22) Filed: Oct. 16, 2018

(65) Prior Publication Data
US 2020/0117583 A1 Apr. 16, 2020

(51) Int. Cl.
*G06F 9/44* (2018.01)
*G06F 11/36* (2006.01)
*G06N 20/00* (2019.01)

(52) U.S. Cl.
CPC ...... *G06F 11/3688* (2013.01); *G06F 11/3684* (2013.01); *G06F 11/3692* (2013.01); *G06N 20/00* (2019.01)

(58) Field of Classification Search
CPC .................................................. G06F 11/3688
USPC ........................................................ 717/124
See application file for complete search history.

(56) References Cited

U.S. PATENT DOCUMENTS 7,895,565 B1\* 2/2011 Hudgons ............. G06F 11/3684
717/106

\* cited by examiner

*Primary Examiner* — Wei Y Zhen
*Assistant Examiner* — Lanny N Ung
(74) *Attorney, Agent, or Firm* — Campbell Stephenson LLP; Shiv S. Naimpally (57) ABSTRACT

In some examples, a computing device may predict, using a machine learning module, scenarios and transactions associated with a usage of a software package. The computing device may select at least a portion of the scenarios and the transactions to cover a predetermined percentage of a predicted usage of the software package. The computing device may select a subset of unit test cases (e.g., created by software designers to test software units that are components of the software package) and execute the test cases to generate test results to determine whether the software package is ready to be deployed to customers. The computing device may train the machine learning module using at least one of the test results, the portion of the scenarios and the transactions, or the test cases. The test results may be evaluated to determine an effectiveness of the set of test cases.

20 Claims, 4 Drawing Sheets

AUTOMATED TESTCASE BUILD ENGINE AND PREDICTION-BASED TEST SYSTEM

BACKGROUND OF THE INVENTION

Field of the Invention

This invention relates generally to computing devices and, more particularly, to software testing.

DESCRIPTION OF THE RELATED ART

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In conventional software testing, software is tested in multiple phases. At each phase, test engineers manually create test cases for that particular phase and the test cases are not re-used or shared across the different test phases, resulting in duplication of effort. In addition, current testing strategies are to test all possible flows in an attempt to find faults. As the software matures, the software may be modified to add additional software features, resulting in increased testing, and increasing maintenance costs.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may include one or more non-transitory computer readable media storing instructions executable by the one or more processors to perform various operation. The operations may include predicting, by a machine learning module, one or more scenarios associated with a usage of a software package and predicting, by the machine learning module, one or more transactions associated with the usage of the software package. The operations may include selecting at least one scenario of the one or more scenarios and selecting at least one transaction of the one or more transactions. The at least one scenario and the at least one transaction may be selected to cover a predetermined percentage of a predicted usage of the software package. The operations may include selecting a subset of test cases from a set of unit test cases and executing the subset of test cases to generate test results. For example, the set of unit test cases may be created by a software designer to test a unit of software that comprises a component of the software package. The subset of test cases may be selected from the set of unit test cases based at least in part on the at least one scenario and the at least one transaction. The test cases may be executed by a test case engine. The operations may include determining that the test results indicate that the software package is ready to be deployed to customers. The operations may include training the machine learning module using at least one of the test results, the at least one scenario, the at least one transaction, or the set of test cases. The test results may be evaluated to determine an effectiveness of the set of test cases.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable test cases developed for unit testing to be used in other phases of testing, such as, for example, component testing, application programming interface (API) testing, integration testing, business scenario testing, and the like. An automated testcase build engine may select a portion of the unit test cases for each phase of testing. The test cases may be automated, e.g., the test cases may be executed automatically, without human interaction, and the results stored and analyzed to determine if any errors were identified during testing. Unit test cases are an integral part of the software development process. At least a portion of the unit test cases are re-used in subsequent testing phases to reduce the amount of effort to develop test cases for the subsequent testing phases.

The systems and techniques described herein enable a prediction-based test system (PBOT), which may be used during the final stage of testing in a software development lifecycle, to perform partial testing of the software and use the results of the partial testing to predict a quality (e.g., number of errors) of the software using machine learning (e.g., support vector machine, Bayesian, or the like). Instead of testing all possible flows within the software, those flows that are used a predetermined amount (e.g., 95%) of time may be identified (e.g., predicted using machine learning) and tested. For example, for most software, particular (e.g., primary) flows may be executed a large portion (e.g., 95%) of the time while the remaining flows may be executed infrequently (e.g., 5% of the time). Machine learning may be used to identify the particular flows that are frequently executed. Test cases that provide coverage for the frequently executed flows can be identified and executed.

For example, a computing device may include one or more non-transitory computer readable media storing instructions executable by the one or more processors to perform various operation. The operations may include predicting, by a machine learning module, one or more scenarios associated with a usage of a software package and predicting, by the machine learning module, one or more transactions associated with the usage of the software package. The operations may include selecting at least one scenario of the one or more scenarios and selecting at least one transaction of the one or more transactions. The at least one scenario and the at least one transaction may be selected to cover a predetermined percentage of a predicted usage of the software package. The operations may include selecting a subset of test cases from a set of unit test cases and executing the subset of test cases to generate test results. For example, the set of unit test cases may be created by a software designer to test a unit of software that comprises a component of the software package. The subset of test cases may be selected from the set of unit test cases based at least in part on the at least one scenario and the at least one transaction. The test cases may be executed by a test case engine. The operations may include determining that the test results indicate that the software package is ready to be deployed to customers. The operations may include training the machine learning module using at least one of the test results, the at least one scenario, the at least one transaction, or the set of test cases. The test results may be evaluated to determine an effectiveness of the set of test cases.

Figure 1:
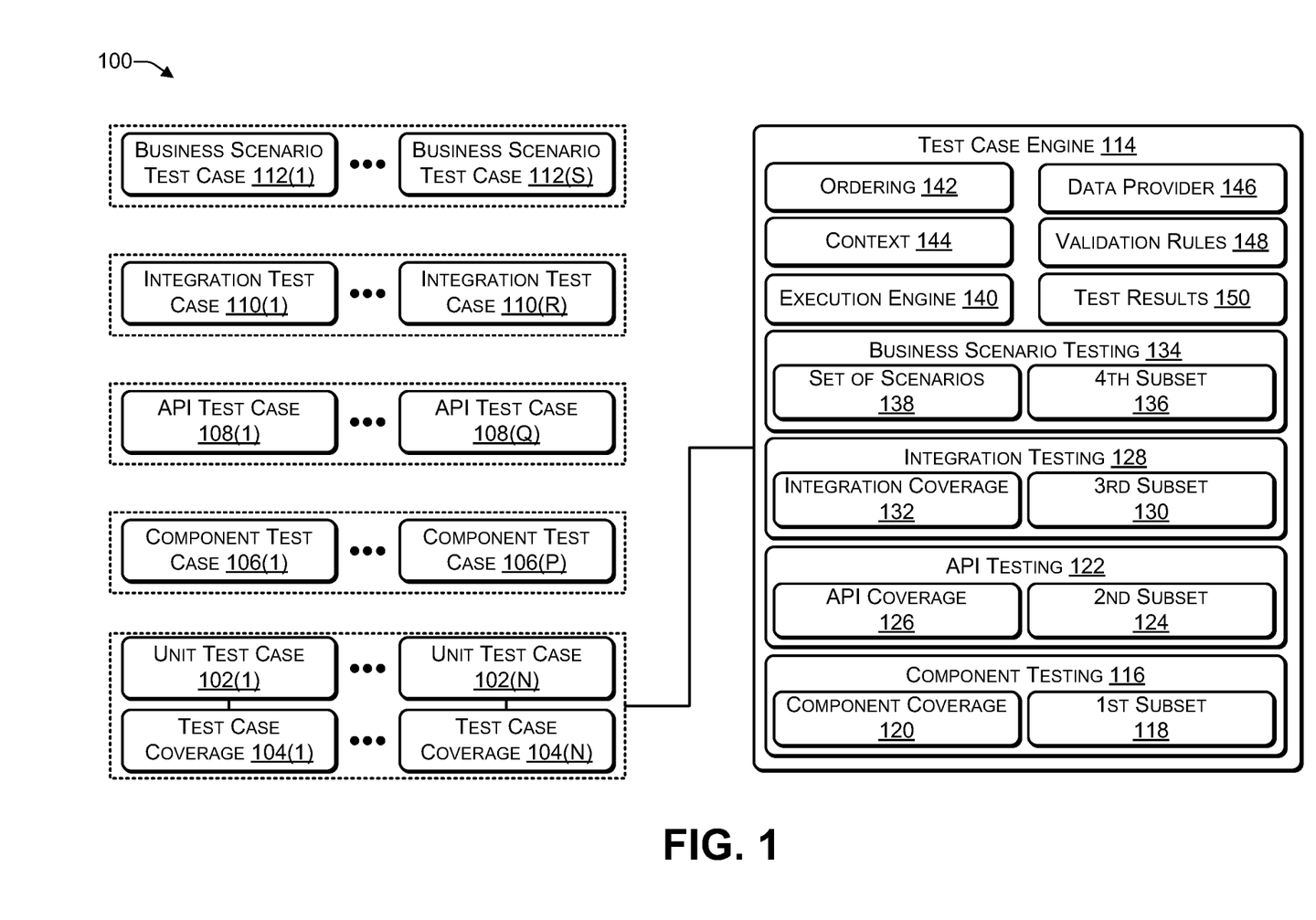
FIG. 1 is a block diagram of a system that includes a test case engine, according to some embodiments.

FIG. 1 is a block diagram of a system 100 that includes a test case engine, according to some embodiments. Software designers who develop software units may create multiple unit test cases 102(1) to 102(N) (N>0) to test the software units. Each unit test case 102 may provide a corresponding test case coverage 104. The test case coverage 104 identifies the flows (e.g., paths or functions) of the software that the corresponding unit test case 102 is designed to test.

In a conventional testing environment (shown on the left side of FIG. 1), a component tester may create component test cases 106(1) to 106(P) (P>0), an API tester may create API test cases 108(1) to 108(Q) (Q>0), an integration tester may create integration test cases 106(1) to 106(R) (R>0), and a business scenario tester may create business scenario test cases 106(1) to 106(S) (S>0). In some cases, each the test cases, 102, 106, 108, 110, and 112 may be developed using a different test case programming language. For this reason, in a conventional testing environment, test cases may not be shared from one phase (e.g., unit testing) to a next phase (e.g., component testing), resulting in a duplication of effort.

A test case engine 114 (shown on the right side of FIG. 1) may re-use at least a portion of the unit test cases 102 at each subsequent testing phase (e.g., component testing, API testing, integration testing, and business case testing), thereby eliminating the use of the test cases 106, 108, 110, and 112. Thus, by using the test case engine 114, the time and effort to create and test software using the test cases 106, 108, 110, and 112 can be saved. In addition, subsequent testing phases can be performed much sooner in the product development lifecycle because there is no waiting for the development of the test cases 106, 108, 110, and 112.

The unit test cases 102 may be used to perform unit testing of multiple software units. For example, in a test-driven development (TDD) environment, usage scenarios are used to create specific test cases and the software is modified to pass the test cases. In the TDD environment, when a software engineer is creating the software code to perform a particular function, the engineer also creates the unit test cases (e.g., part of the unit test cases 102) for the particular function. The unit test cases 102 may follow a pre-defined format to enable the test case engine 114 to re-use the unit test cases 102 for the testing 116, 122, 128, and 134. For example, if a software unit is designed to provide (e.g., return) a price of a product added to a cart, the corresponding unit test case may test to determine if the software unit provides the correct price of a product that has been added to a cart.

After the unit test cases 102 have been used to perform unit testing, the test case engine 114 may, prior to performing component testing 116, select a first subset 118 of the unit test cases 102. The first subset 118 may be selected to provide a particular amount of component coverage 120. For example, a particular software component may be designed to perform a particular set of functions and the first subset 118 may be selected from the unit test cases 102 to provide coverage for the particular set of functions (e.g., determine whether components are capable of performing the particular set of functions). In component testing, each component may be created using a particular programming language, such as assembly language, a dynamic-link library (DLL), Java® archive (JAR), or the like. Each software component may provide one or more function to another software component. The component testing 116 is performed using a first subset 118 of the unit test cases 102. For example, a component may determine an amount of an invoice by determining a price for a product and by applying a discount (e.g., applied using a discount code). Testing such a component may include using a first unit test case to determine a price of a product and a second unit test case to receive a discount code and apply a corresponding discount to the price of the product.

The test case engine 114 may, prior to performing API testing 122, select a second subset 124 of the unit test cases 102. The second subset 124 may be selected to provide a particular amount of API coverage 126. For example, a particular software API may be designed to perform a particular set of functions and the second subset 124 may be selected from the unit test cases 102 to provide coverage for the particular set of functions (e.g., determine whether each API is capable of performing a corresponding set of functions). The API testing 122 may also be referred to as service-level testing. An API (e.g., services) may leverage multiple components to achieve a particular purpose. For example, to place an order on an e-commerce site, multiple components may be used, such as for example, a first component to fetch prices for products, a second component to calculate one or more discounts, a third component to authenticate each user, a fourth component to persist order details (e.g., if a customer is using a first computing device and adds a product to a cart, when the customer uses a second computing device, the product is displayed in the cart). The API testing 122 may reuse a portion of the previously created unit test cases 102 by sequencing them in a particular order and by providing a particular context within which to execute a particular set of data.

The test case engine 114 may, prior to performing integration testing 128, select a third subset 130 of the unit test cases 102. The third subset 130 may be selected to provide a particular amount of integration coverage 126. For example, multiple software components may be integrated into a software product and the third subset 130 may be selected from the unit test cases 102 to provide coverage to determine how well the various components have been integrated. To illustrate, a first component may provide a set of values to a second component. The second component may perform one or more functions using the set of values as inputs and provide the output to the first component. In this example, the third subset 130 may be selected to test whether the first component is providing the correct values to the second component, whether the second component is receiving the set of values from the first component, whether the second component is returning the correct output to the first component, and so on. In a software product (e.g., enterprise software) multiple systems may be linked together to achieve a particular set of functions. For example, an order placed through a web application may be communicated to warehouse for fulfillment. Typically, the order placement process may use a first computing system and the warehouse may use a second computing system (e.g., different from the first computing system). The integration testing 128 tests whether the communications between two or more systems is working properly, e.g., whether the first system is sending the correct information to the second system, whether the second system is performing the appropriate tasks with the information received from the first system, etc.

The test case engine 114 may, prior to performing business scenario testing 134, select a fourth subset 136 of the unit test cases 102. The fourth subset 136 may be selected to test a particular set of scenarios 138 (e.g., common business scenarios). For example, a software application may include multiple software components and APIs and may be designed to be used in a particular set of scenarios. To illustrate, an e-commerce application may be designed to enable a customer to add items that are to be acquired (e.g., leased or purchased) to a cart and check out by providing a payment method. The e-commerce application may generate an invoice and shipping label after the customer has checked out. The set of scenarios 138 may include a scenario where a customer adds multiple items to a cart and checks out. The fourth subset 136 may include tests to determine whether the invoice and shipping label are generated with the correct information when a customer checks out. The business scenario testing 134 focuses more on an end-user's experience from entry to exit.

An execution engine 140 may select the first subset 118 to perform the component testing 116, select the second subset 124 to perform the API testing 122, select the third subset 130 to perform the integration testing 128, and select the fourth subset 136 to perform the business scenario testing 134. At each of the testing phases 116, 122, 128, and 134 may the execution engine 140 may use an ordering module 142 to determine an order in which to execute the corresponding subsets 118, 124, 130, and 136. The execution engine 140 may use a context module 144 to create a context (e.g., test environment) in which to execute the subsets 118, 124, 130, and 136. The execution engine 140 may use a data provider module 144 to provide test data when executing the unit tests in the subsets 118, 124, 130, and 136. The execution engine 140 may use validation rules 148 to validate test results 150 of executing the subsets 118, 124, 130, and 136. For example, to perform the business scenario testing 134, the execution engine 140 may select the fourth subset 136 of the unit test cases 102, the ordering module 142 may determine an order in which to execute unit test cases in the fourth subset 136, the context module 144 may provide context information that is used by the data provider 146 to create data to test the software, and the validation rules 148 may be used to determine evaluate the test results 150 resulting from executing the unit test cases in the fourth subset 136 to determine whether the software being tested is performing correctly or whether there are errors that need to be corrected. The data provider 146 may persist, refresh, and maintain data used for testing at each testing phase. The ordering module 142 may automatically determine an execution order for test cases to provide a particular amount of coverage (e.g., the coverage 120, 126, 132, or 138). In some cases, the ordering module 142 may provide a graphical user interface (GUI) to enable a user (e.g., a tester) to select particular ones of the unit test cases 102 and to sequence them in a particular execution order. The execution engine 140 may execute a particular subset (e.g., one of the subsets 118, 124, 130, or 136) of the unit test cases 102 in a particular order using a particular context (test execution environment), validating the test results 150, and providing a report with the test results 150.

Thus, unit test cases created by software designers (e.g., in a TDD environment) may be re-used at subsequent testing phases, such as during component testing, API testing, integration testing, and business scenario testing. At each testing phase, a portion of the unit test cases may be selected and orchestrated, e.g., placed into a particular execution order. A context module may create a context in which to test the software and a data module may provide data (e.g., used as input during testing). A test case engine may execute the unit tests cases in the particular execution order using the context and the provided data to create test results. The test case engine may use validation rules to determine whether the test results indicate the presence of any errors (or potential errors) in the software being tested. If the test results indicate that there are less than a predetermined number (or percentage) of problems, the software may proceed to the next testing phase. If the test results indicate that there are less than a predetermined number (or percentage) of problems at the business scenario testing phase, then the software may be made available to customers (e.g., the software may be referred to as ready to manufacture (RTM)). If the test results at a particular testing phase indicate that there at least a predetermined number (or percentage) of problems, then the software may be modified to address the problems, and the particular testing phase may be repeated with the modified software.

Figure 2:
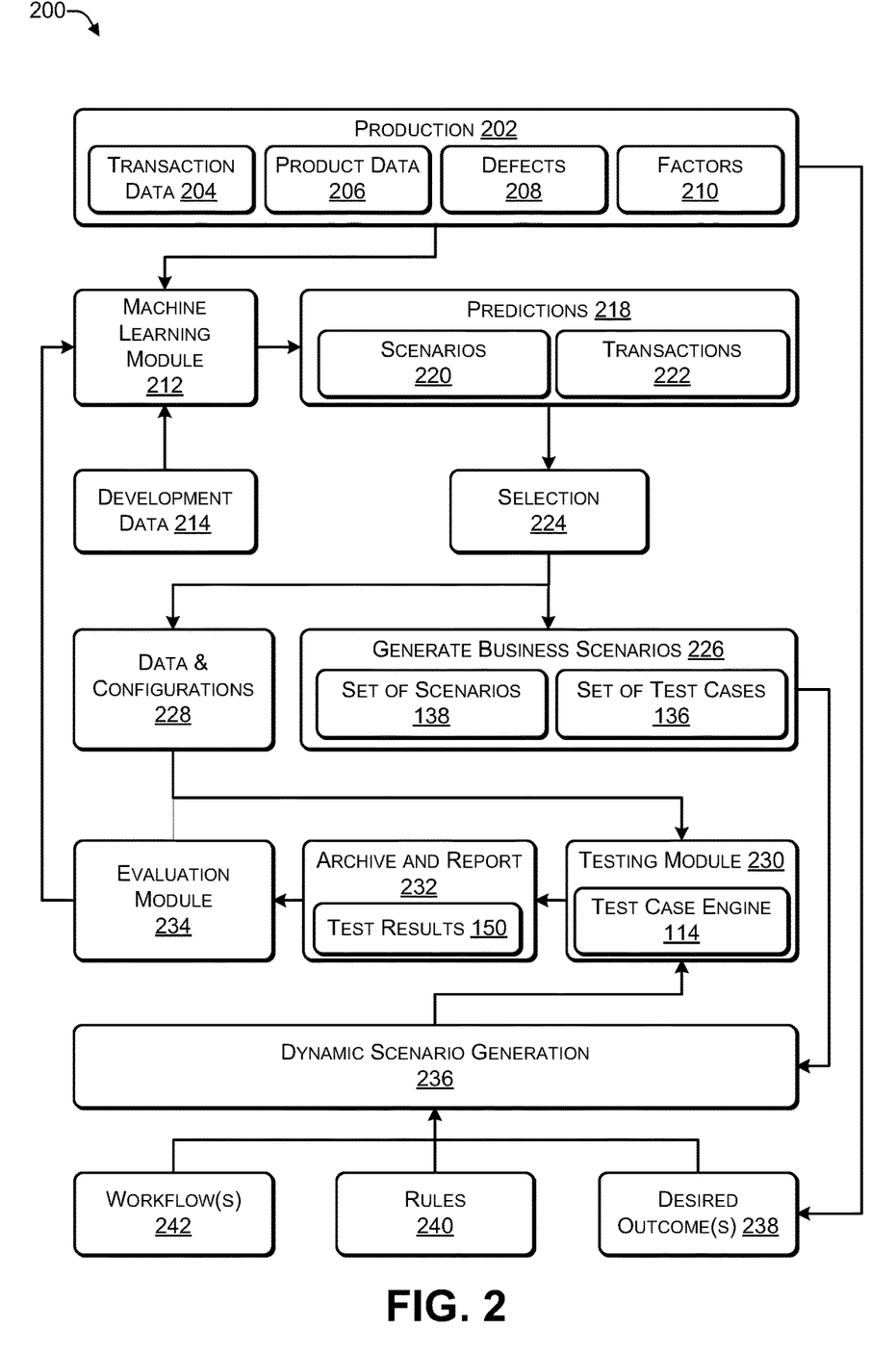
FIG. 2 is a block diagram of a system that includes a machine learning module, according to some embodiments.

FIG. 2 is a block diagram of a system 200 that includes a machine learning module, according to some embodiments. Various types of data may be collected from production 202 and analyzed using a machine learning module 212. For example, transaction data 204 may be analyzed using the machine learning module 212 to learn information about types of business transactions that occur, including identifying historical patterns and seasonal patterns (e.g., X percentage of customers buy a new laptop in November). As another example, product data 206 from customers, including browsing-related information and orders placed may be analyzed using the machine learning module 212. As a further example, defects 208, such as production issues, unexpected events that have caused delays in the past, and the like, may be analyzed using the machine learning module 212. As yet another example, influencing factors 210, such as seasonal information (e.g., historical weather patterns adversely affecting shipments), new product launches by another business unit or by a competitor that have an effect on revenue may be analyzed using the machine learning module 212. The machine learning module 212 may analyze data gathered during software development 214 phases, including data associated with changes (e.g., bug fixes and added features) to existing software.

The machine learning module 212 may use the production data 202 and the development data 214 to make predictions 218 for a predetermined time period (e.g., one year, six months, or the like). The predictions 218 may include predictions regarding scenarios 220, such as situations in which different types of customers, e.g., enterprise (e.g., corporate) customers, college students, high school students, other consumers, and the like, may use software. The predictions 218 may include types of transactions 222 that the different types of customers may perform in the various scenarios 220. The predictions 218 may thus predict the scenarios 220 in which software may be used and predict the types of transactions 222 that may be performed in each of the scenarios 220. A selection 224 of the most common of the scenarios 220 and of the transactions 222 may be determined for testing. For example, software testing can be performed to cover X % (e.g., 90%, 95%, 98% and the like) of the most commonly predicted of the scenarios 220 and Y % (e.g., 90%, 95%, 98% and the like) of the most commonly performed transactions 222 in the scenarios 220. Thus, testing of the software may not be performed for scenarios and transactions that are predicted to be infrequently encountered by customers (e.g., less than a threshold percentage).

A generate business scenarios module 226 may create the set of scenarios 138 to test the software based on the selection 224 of the predictions 218, e.g., the set of scenarios 138 predicted to cover a large (e.g., X) percentage of scenarios. The set of scenarios 138 may be used to select the set of test cases 136 (e.g., a subset of the unit test cases 102(1) to 102(N) of FIG. 1) that cover the selection 224. The selection 224 may be used to generate data and configurations 228 for use in testing the set of scenarios 138. For example, to test an e-commerce website, the data and configurations 228 may include multiple order data and various configurations (e.g., checkout an order with multiple items including receiving payment and creating a shipping manifest, receiving a request to cancel an item from an order after the order is placed, receiving a request to return an item for a refund, and the like). A testing module 230 may use the test case engine 114 to test the set of scenarios 130 using the data and configurations 228 to produce the test results 150.

An archive and report module 232 may archive the test results 150 and generate one or more reports on the test results 150. For example, a report may specify that <A> number of test cases were executed to cover <B> % of business scenarios and <C> % of transactions in the scenarios. The report may specify the number of errors that were found when executing the set of test cases 136 and the pass/fail ratio of executing the set of test cases 136. An evaluation module 234 may evaluate the test results 150 to determine an effectiveness of the predictions 218 and the resulting set of scenarios 138 and the data and configuration 228. The evaluation module 234 may provide the results of evaluating the test results 150 as input to the machine learning module 212. For example, the machine learning module 212 may be re-trained using training data that includes one or more of the predictions 218, the selection 224, the set of scenarios 138, the set of test cases 136, the data and configurations 228, the test results 150, and results from the evaluation module 234.

In some cases, at least a portion of the scenarios may be dynamically (e.g., substantially in real-time) generated using a dynamic scenario generation module 236. For example, the generate business scenarios module 226 may provide one or more desired outcomes 238 and these outcomes may be used by the dynamic scenario generation module 236 to dynamically generate scenarios. The dynamic scenario generation module 236 may use one or more rules 240 regarding the types of scenarios and transactions to dynamically generate scenarios. The dynamic scenario generation module 236 may use one or more workflows 242 regarding the types of workflows to cover to dynamically generate scenarios. The scenarios dynamically generated by the dynamic scenario generation module 236 may provide different coverage than the unit test cases 102 and may be tested by the testing module 230 using the test case engine 230.

Figure 3:
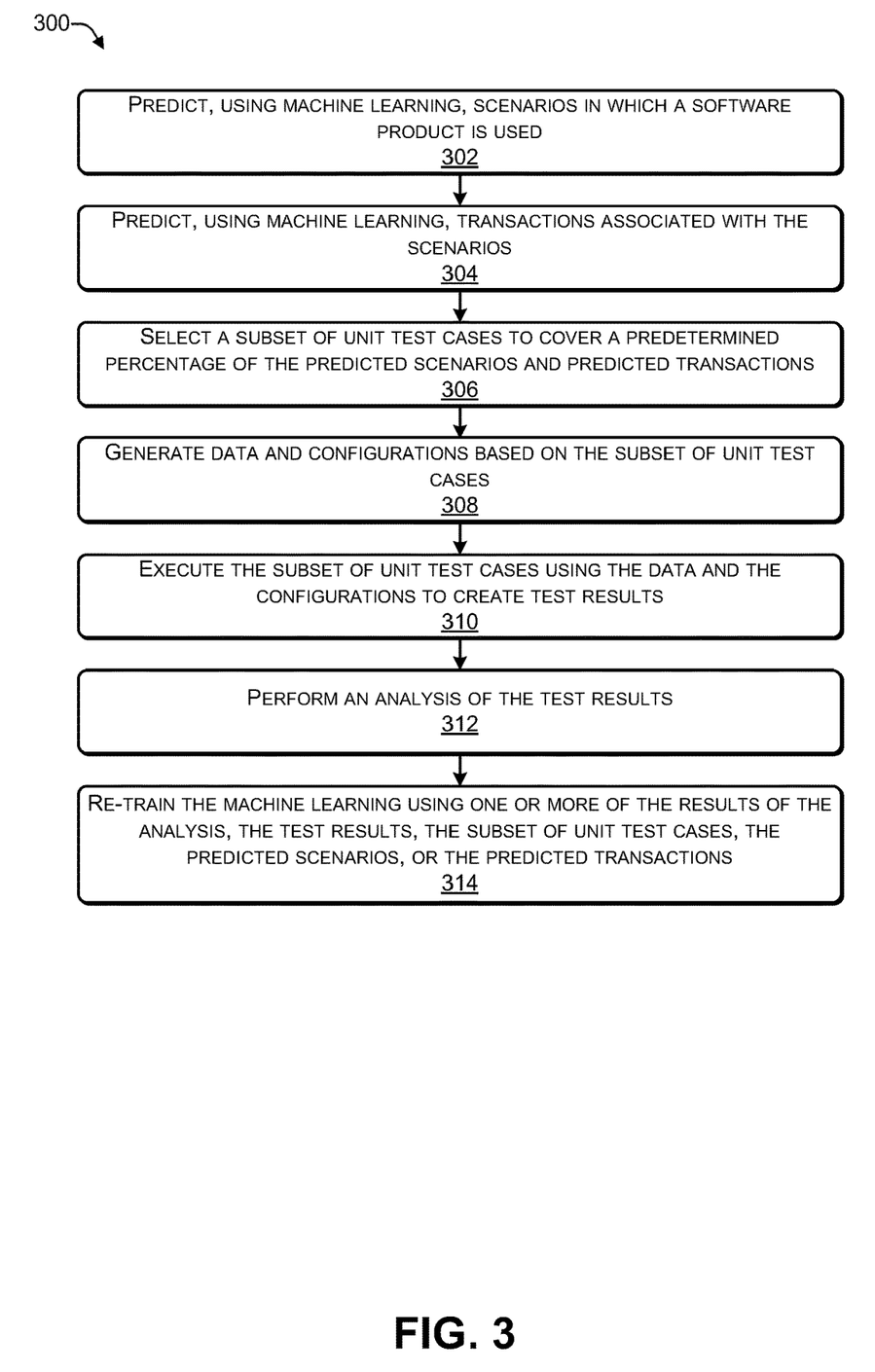
FIG. 3 is a flowchart of a process that includes predicting scenarios and transactions, according to some embodiments.

In the flow diagram of FIG. 3, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 300 is described with reference to FIGS. 1 and 2, as described above, although other models, frameworks, systems and environments may be used to implement these processes.

FIG. 3 is a flowchart of a process 300 that includes predicting scenarios and transactions, according to some embodiments. For example, the process 300 may be performed by one or more components of the system 200 of FIG. 2.

At 302, scenarios in which a software product is to be used are predicted using a machine learning algorithm (e.g., trained using historical data). At 304, transactions associated with the scenarios are predicted using the machine learning algorithm. For example, in FIG. 2, the machine learning module 212 may make the predictions 218, including the scenarios 220 in which the software may be used and the transactions 222 that may be performed in each of the scenarios 220.

At 306, a subset of unit test cases to cover a predetermined percentage of the predicted scenarios and the predicted transactions may be selected. At 308, data and configuration information may be generated based on the subset of unit test cases that are selected. For example, in FIG. 2, the selection 224 may select a portion of the scenarios 220 and the transactions 222 that are predicted to be encountered a pre-determined amount (or percentage) of time. The selection 224 may cover X % (e.g., where X=90, 95, 98 or the like) of the scenarios 220 and the transactions 222 that are predicted for the usage of the software. Thus, the most common set of scenarios and transactions may be tested while scenarios and transactions that are rarely encountered may not be tested. In this way, the time and effort to perform software testing may be focused on the most common set of scenarios and transactions.

At 310, the subset of unit test cases may be executed using the data and the configurations to create test results. At 312, the test results may be analyzed. For example, in FIG. 2, the test case engine 114 may be used to execute the set of test cases 136 that cover the set of scenarios 138 to create the test results 150. The evaluation module 234 may evaluate the test results 150.

At 314, the machine learning module algorithm may be re-trained using one or more of the results of the analysis, the test results, the subset of unit test cases, the predicted scenarios, or the predicted transactions. For example, in FIG. 2, the machine learning module 212 may be re-trained using training data that includes one or more of the results of the evaluation module 234, the test results 150, the set of test cases 136 (e.g., a subset of the unit test cases 102), the predicted scenarios 220, or the predicted transactions 222.

Figure 4:
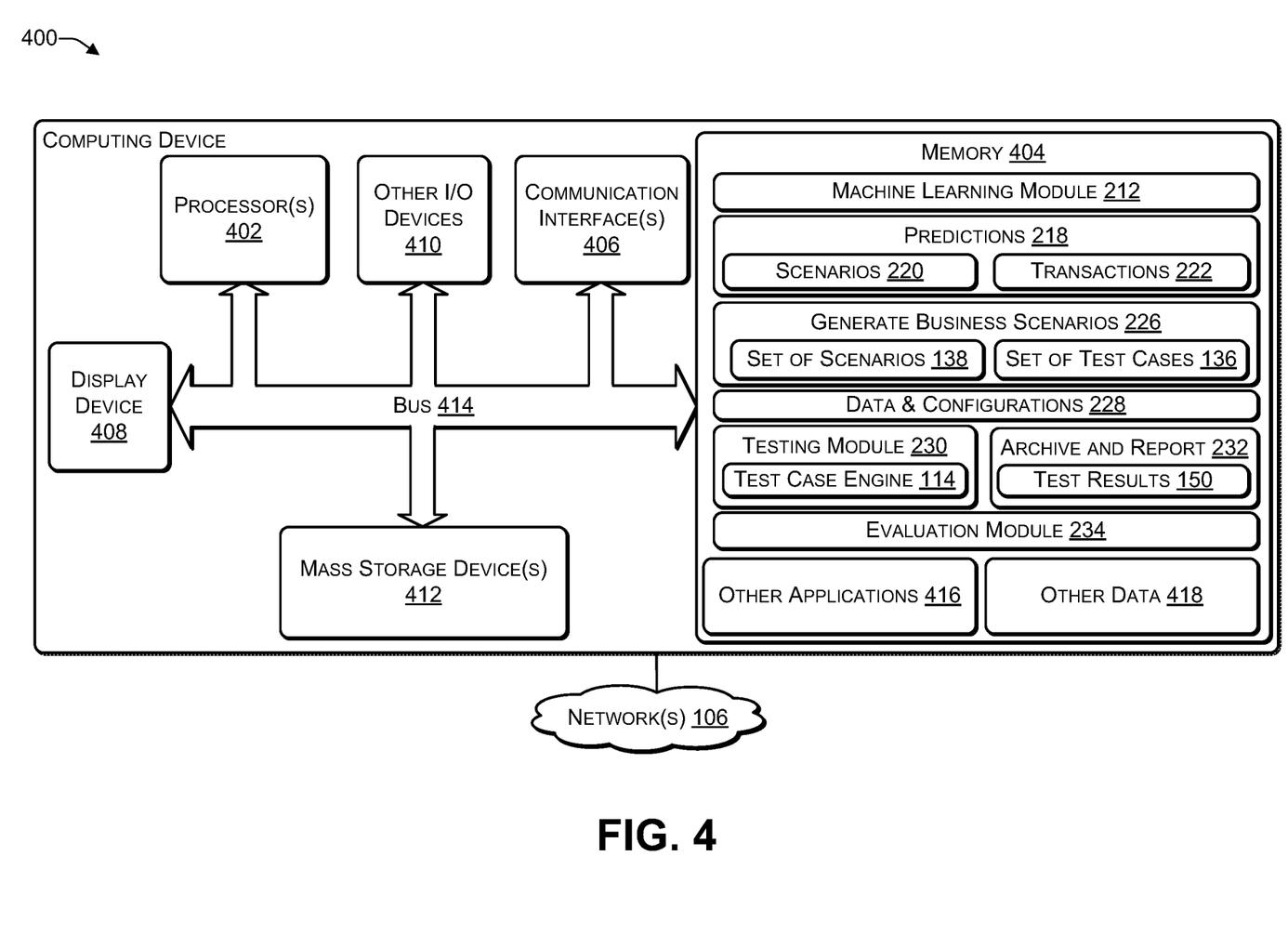
FIG. 4 illustrates an example configuration of a computing device that can be used to implement the systems and techniques described herein.

FIG. 4 illustrates an example configuration of a computing device 400 that can be used to implement the systems and techniques described herein. For example, the computing device 400 may execute the test case engine 114 of FIG. 1 and the system 200 illustrated in FIG. 2.

The computing device 400 may include one or more processors 402 (e.g., CPU, GPU, or the like), a memory 404, communication interfaces 406, a display device 408, other input/output (I/O) devices 410 (e.g., keyboard, trackball, and the like), and one or more mass storage devices 412 (e.g., disk drive, solid state disk drive, or the like), configured to communicate with each other, such as via one or more system buses 414 or other suitable connections. While a single system bus 414 is illustrated for ease of understanding, it should be understood that the system buses 414 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 402 are one or more hardware devices that may include a single processing unit or a number of processing units, all of which may include single or multiple computing units or multiple cores. The processors 402 may include a graphics processing unit (GPU) that is integrated into the CPU or the GPU may be a separate processor device from the CPU. The processors 402 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 402 may be configured to fetch and execute computer-readable instructions stored in the memory 404, mass storage devices 412, or other computer-readable media.

Memory 404 and mass storage devices 412 are examples of computer storage media (e.g., memory storage devices) for storing instructions that can be executed by the processors 402 to perform the various functions described herein. For example, memory 404 may include both volatile memory and non-volatile memory (e.g., RAM, ROM, or the like) devices. Further, mass storage devices 412 may include hard disk drives, solid-state drives, removable media, including external and removable drives, memory cards, flash memory, floppy disks, optical disks (e.g., CD, DVD), a storage array, a network attached storage, a storage area network, or the like. Both memory 404 and mass storage devices 412 may be collectively referred to as memory or computer storage media herein and may be any type of non-transitory media capable of storing computer-readable, processor-executable program instructions as computer program code that can be executed by the processors 402 as a particular machine configured for carrying out the operations and functions described in the implementations herein.

The computing device 400 may include one or more communication interfaces 406 for exchanging data via the network 106. The communication interfaces 406 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 406 can also provide communication with external storage, such as a storage array, network attached storage, storage area network, cloud storage, or the like.

The display device 408 may be used for displaying content (e.g., information and images) to users. Other I/O devices 410 may be devices that receive various inputs from a user and provide various outputs to the user, and may include a keyboard, a touchpad, a mouse, a printer, audio input/output devices, and so forth.

The computer storage media, such as memory 116 and mass storage devices 412, may be used to store software and data. For example, the computer storage media may be used to store the machine learning module 212, the predictions 218, the set of scenarios 138, the set of test cases 136, the testing module 230, the test results 150, the evaluation module 234, other applications 416, and other data 418.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
performing, by one or more processors, an analysis of transaction data associated with a business;
determining, by the one or more processors and based on the analysis, types of business transactions including historical patterns and seasonal patterns associated with the business;
predicting, by a machine learning module executed by the one or more processors, a plurality of scenarios associated with a usage of a software package based at least in part on the types of business transactions;
predicting, by the machine learning module executed by the one or more processors, one or more transactions associated with the usage of the software package in each scenario of the plurality of scenarios;
selecting, by the one or more processors, at least one scenario of the plurality of scenarios to cover a predetermined percentage of a predicted usage of the software package;
selecting, by the one or more processors, at least one transaction of the one or more transactions to cover a predetermined percentage of a predicted usage of the software package;
selecting, by the one or more processors, a subset of test cases from a set of unit test cases to cover the at least one scenario and the at least one transaction;
executing, by the one or more processors, the subset of test cases to generate test results; and
determining, by the one or more processors, that the test results indicate that the software package is ready to be deployed to customers.

2. The method of claim 1, wherein one or more of the unit test cases are created by a software designer to test a unit of software that comprises a component of the software package.

3. The method of claim 1, further comprising:
training the machine learning module using at least one of the test results, the at least one scenario, the at least one transaction, or the set of test cases.

4. The method of claim 1, wherein the test cases are executed by a test case engine.

5. The method of claim 1, further comprising:
evaluating the test results to determine an effectiveness of the set of test cases.

6. A computing device comprising:
one or more processors; and
one or more non-transitory computer readable media storing instructions executable by the one or more processors to perform operations comprising:
performing an analysis of transaction data associated with a business;
determining, based on the analysis, types of business transactions including historical patterns and seasonal patterns associated with the business;
predicting, by a machine learning module, a plurality of scenarios associated with a usage of a software package;
predicting, by the machine learning module, one or more transactions associated with the usage of the software package in each of the plurality of scenarios;
selecting at least one scenario of the plurality of scenarios to cover a predetermined percentage of a predicted usage of the software package;
selecting at least one transaction of the one or more transactions in each of the plurality of scenarios;
selecting a subset of test cases from a set of unit test cases to cover the at least one scenario and the at least one transaction;
executing the subset of test cases to generate test results; and
determining that the test results indicate that the software package is ready to be deployed to customers.

7. The computing device of claim 6, wherein one or more of the unit test cases are created by a software designer to test a unit of software that comprises a component of the software package.

8. The computing device of claim 6, further comprising:
training the machine learning module using at least one of the test results, the at least one scenario, the at least one transaction, or the set of test cases.

9. The computing device of claim 6, wherein the test cases are executed by a test case engine.

10. One or more non-transitory computer readable media storing instructions executable by one or more processors to perform operations comprising:
performing an analysis of transaction data associated with a business;
determining, based on the analysis, types of business transactions including historical patterns and seasonal patterns associated with the business;
predicting, by a machine learning module, a plurality of scenarios associated with a usage of a software package;
predicting, by the machine learning module, one or more transactions associated with the usage of the software package in each of the plurality of scenarios;
selecting at least one scenario of the plurality of scenarios to cover a predetermined percentage of a predicted usage of the software package;
selecting at least one transaction of the one or more transactions to cover a predetermined percentage of a predicted usage of the software package;
selecting a subset of test cases from a set of unit test cases to cover the at least one scenario and the at least one transaction;

executing the subset of test cases to generate test results; and determining that the test results indicate that the software package is ready to be deployed to customers.

11. The one or more non-transitory computer readable media of claim 10, wherein one or more of the unit test cases are created by a software designer to test a unit of software that comprises a component of the software package.

12. The one or more non-transitory computer readable media of claim 10, wherein the operations further comprise:
training the machine learning module using at least one of the test results, the at least one scenario, the at least one transaction, or the set of test cases.

13. The one or more non-transitory computer readable media of claim 10, wherein the test cases are executed by a test case engine.

14. The one or more non-transitory computer readable media of claim 10, further comprising:
evaluating the test results to determine an effectiveness of the set of test cases.

15. The method of claim 1, further comprising:
generating, based on a set of rules, one or more desired outcomes;
generating one or more additional transactions based at least in part on:
the plurality of scenarios; and
one or more desired outcomes; and
selecting at least one additional transaction of the one or more additional transactions to provide different coverage than the subset of test cases.

16. The method of claim 1, further comprising:
generating a report based on the test results, the report specifying:
a number of test cases in the subset of test cases that were executed;
a percentage of business scenarios covered by the subset of test cases;
a number of errors caused by executing the subset of test cases;
a pass/fail ratio of executing the subset of test cases.

17. The computing device of claim 6, the operations further comprising:

generating, based on a set of rules, one or more desired outcomes;
generating one or more additional transactions based at least in part on:
the plurality of scenarios; and
one or more desired outcomes; and
selecting at least one additional transaction of the one or more additional transactions to provide different coverage than the subset of test cases.

18. The computing device of claim 6, the operations further comprising:
generating a report based on the test results, the report specifying:
a number of test cases in the subset of test cases that were executed;
a percentage of business scenarios covered by the subset of test cases;
a number of errors caused by executing the subset of test cases;
a pass/fail ratio of executing the subset of test cases.

19. The one or more non-transitory computer readable media of claim 10, wherein the operations further comprise:
generating, based on a set of rules, one or more desired outcomes;
generating one or more additional transactions based at least in part on:
the plurality of scenarios; and
one or more desired outcomes; and
selecting at least one additional transaction of the one or more additional transactions to provide different coverage than the subset of test cases.

20. The one or more non-transitory computer readable media of claim 10, wherein the operations further comprise:
generating a report based on the test results, the report specifying:
a number of test cases in the subset of test cases that were executed;
a percentage of business scenarios covered by the subset of test cases;
a number of errors caused by executing the subset of test cases;
a pass/fail ratio of executing the subset of test cases.

* * * * *